(12) United States Patent
Cheekatla et al.

(10) Patent No.: US 12,273,956 B2
(45) Date of Patent: Apr. 8, 2025

(54) SYSTEMS AND METHODS TO SET AND CHANGE DATA USE PRIORITY IN A MULTI-SUBSCRIBER IDENTITY MODULE DEVICE

(71) Applicant: QUALCOMM Incorporated, San Diego, CA (US)

(72) Inventors: Phaneendra Cheekatla, Hyderabad (IN); Naresh Gundu, Hyderabad (IN); Shankar Ganesh Lakshmanaswamy, Bangalore (IN); Anandbabu Musuathy Sadasivan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/663,402

(22) Filed: May 13, 2022

(65) Prior Publication Data
US 2023/0370831 A1    Nov. 16, 2023

(51) Int. Cl.
*H04W 8/18*      (2009.01)
*H04L 1/00*      (2006.01)
*H04W 48/02*      (2009.01)

(52) U.S. Cl.
CPC ............. *H04W 8/18* (2013.01); *H04L 1/0002* (2013.01); *H04W 48/02* (2013.01)

(58) Field of Classification Search
CPC ................................ H04W 8/18; H04W 48/02

USPC .......................................................... 455/418
See application file for complete search history.

(56) References Cited

U.S. PATENT DOCUMENTS

2018/0034736 A1\*   2/2018   Anchan ............... H04L 47/2433
2021/0029773 A1\*   1/2021   Majumder ............ H04W 76/15

\* cited by examiner

*Primary Examiner* — Ahmad F. Matar
*Assistant Examiner* — Jirapon Tulop
(74) *Attorney, Agent, or Firm* — Haynes and Boone, LLP (36340/49606)

(57) ABSTRACT

A method of wireless communication, performed by a user equipment (UE), includes: participating in a first communication session associated with a first subscriber identity module (SIM) and participating in a second communication session associated with a second SIM, wherein the UE comprises the first SIM and the second SIM; applying a higher priority of access to radio frequency (RF) resources of the UE to transmissions of the first communication session over transmissions of the second communication session; detecting a first type of packet within a data queue, the first type of packet being associated with the first communication session; in response to the detecting of the first type of packet, changing the higher priority of access to the transmissions of the second communication session; and returning the higher priority of access to the transmissions of the first communication session subsequent to the first type of packet being transmitted.

27 Claims, 7 Drawing Sheets

SYSTEMS AND METHODS TO SET AND CHANGE DATA USE PRIORITY IN A MULTI-SUBSCRIBER IDENTITY MODULE DEVICE

TECHNICAL FIELD

This application relates to wireless communication systems, and more particularly to setting and changing data use priority in multi-subscriber identity module (multi-SIM) devices.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMS) within UEs.

However, including multiple SIMS within a device may lead to scenarios in which activities associated with one SIM may interfere with or preclude activities associated with the other SIM. There is a need in the art for techniques to manage use of multiple service provider subscriptions in multi-SIM devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is performed by a user equipment (UE). The method of wireless communication also includes participating in a first communication session associated with a first subscriber identity module (SIM) and participating in a second communication session associated with a second SIM, where the UE may include the first SIM and the second SIM; applying a higher priority of access to radio frequency (RF) resources of the UE to transmissions of the first communication session over transmissions of the second communication session; detecting a first type of packet within a data queue, the first type of packet being associated with the first communication session; in response to the detecting of the first type of packet, changing the higher priority of access to the transmissions of the second communication session; and returning the higher priority of access to the transmissions of the first communication session subsequent to the first type of packet being transmitted.

In an additional aspect of the disclosure, a user equipment (UE) includes a first subscriber identity module (SIM) associated with a first service provider subscription and a second SIM associated with a second service provider subscription; and a processor configured to access the first SIM and the second SIM, where the processor is further configured to: operate in a mode in which the first service provider subscription and the second service provider subscription are concurrently active, further where the mode includes a first application associated with the first service provider subscription having priority over a second application associated with the second service provider subscription. identify silence associated with the first application; change the priority to the second application over the first application in response to identifying a silence; return priority to the first application subsequent to a duration of the silence.

In an additional aspect of the disclosure, a non-transitory computer-readable medium having program code recorded thereon for wireless communication by a user equipment (UE), and the non-transitory computer-readable medium includes code for operating in a mode in which a first service provider subscription associated with a first subscriber identity module (SIM) and a second service provider subscription associated with a second SIM share radio frequency (RF) transmission resources of the UE; code for applying a higher priority to first data packets, associated with the first service provider subscription, than to second data packets, associated with the second service provider subscription, as a default for transmission during the mode; code for applying the higher priority to the second data packets, over the first data packets, in response to identifying a silence duration associated with the first service provider subscription; and code for returning the higher priority to the first data packets subsequent to the silence duration.

In an additional aspect of the disclosure, a UE includes a first subscriber identity module (SIM) associated with a first service provider subscription and a second SIM associated with a second service provider subscription; means for concurrently running a voice application and a gaming application, where the voice application is associated with the first service provider subscription and the gaming application is associated with the second service provider subscription; and means for setting a transmission priority for the voice application relative to the gaming application based at least in part on detecting a silence duration associated with the voice application.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
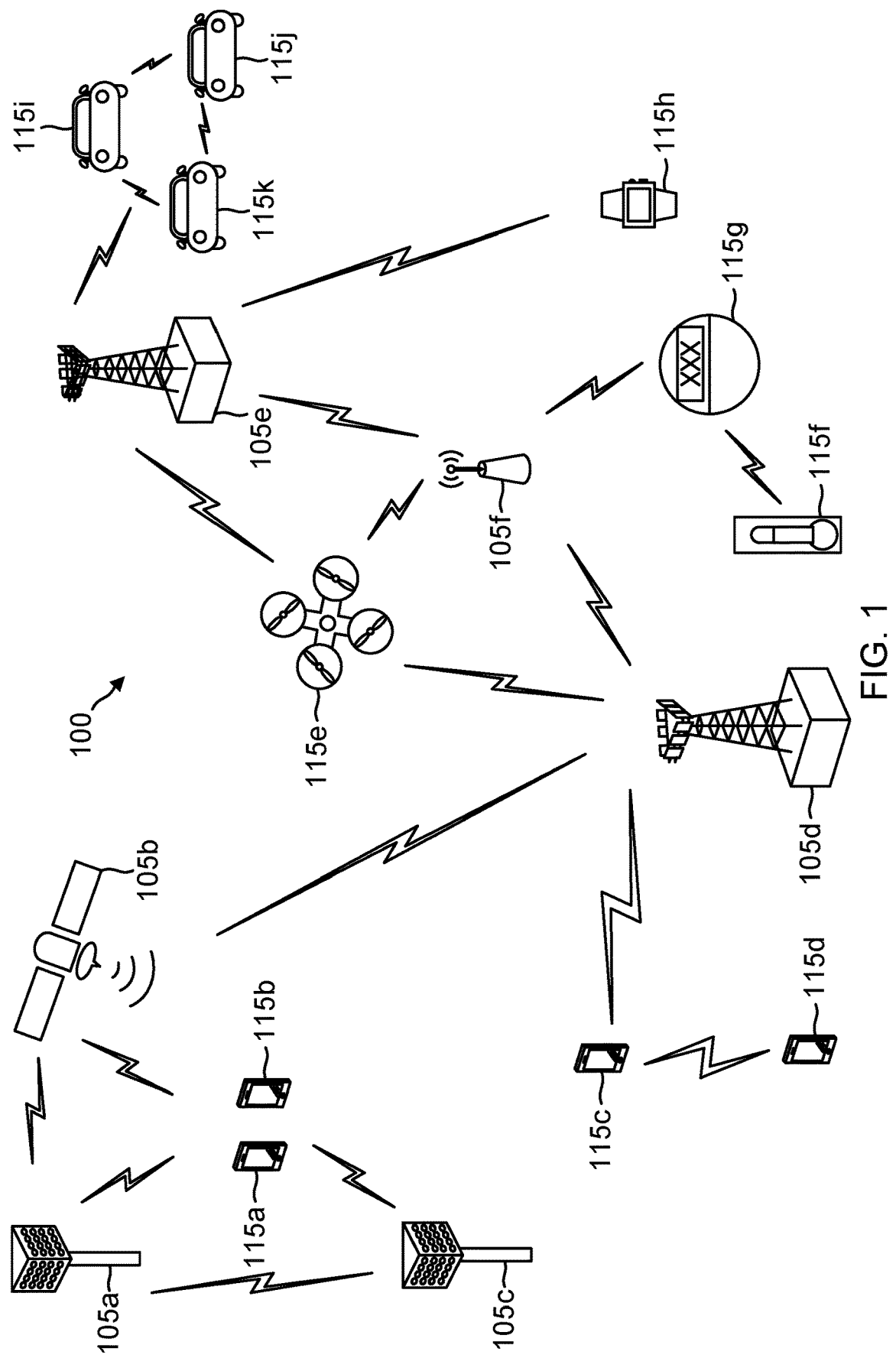
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink (UL) and downlink (DL) to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (multi-SIM) device capable of utilizing multiple subscriptions for communication with one or more networks. For instance, the UE may include two SIMS, a first SIM for a first subscription and a second SIM for a second subscription. In some instances, the first and second subscriptions may be provided by the same service provider. For example, the first subscription and the second subscription may correspond to different user accounts and/or services on the same service provider network. In other instances, the first and second subscriptions may be provided by different service providers. In any case, in certain scenarios, the UE may communicate using the first subscription and/or the second subscription.

In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one subscription may be active at a given time. The DSDS mode may be suitable for UEs that are equipped with a single transceiver and/or radio frequency (RF) chain which can either be utilized by the first subscription or the second subscription.

In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

In some systems, DSDA operation may employ redundant radio frequency (RF) resources as well as redundant software and/or firmware resources to provide concurrency. Some mobile device manufacturers have developed devices that are able to provide concurrency in some scenarios but may be unable to provide concurrency in other scenarios. For example, some devices may lack the hardware, software, and/or firmware redundancy to provide concurrent transmission when a first subscription is using a particular first frequency band and a second subscription is using a particular second frequency band. One nonlimiting example includes a first subscription on N1 band and a second subscription on N1 band where both subscriptions use a single component carrier. In this example, the system may be unable to provide full concurrency in the DSDA mode. This is sometimes referred to as "TX sharing" because a lack of redundancy in the device causes the two subscriptions to share some resources. Continuing with the example, there may be a transmitting conflict in which the device can support one subscription but not the other at a given time. In other words, it may be that the particular frequency resources granted to the two subscriptions may not be used in a same time domain resource.

For a multi-SIM device, one of the SIMS/subscriptions carries the internet data traffic, and it is referred to as the default data subscription (DDS) The other subscription—nDDS—is mainly used for voice and short message service (SMS). The user chooses which subscription is the DDS, and the user may change the DDS through a user interface (UI) of the UE.

Some devices may provide for additional priority rankings that are separate and apart from the DDS designation. For instance, some multi-SIM devices may have as a default setting that voice call applications or voice and video call applications may have priority over gaming applications, which may have priority over web browsing applications, etc. The priority designation for an application has the effect that, when there is a conflict between transmission on a first application and transmission on a second application, the higher priority application has its data transmitted before the data of the second application is transmitted. For instance, when a first subscription is using a voice calling application and a second subscription is using a gaming application, the device may give the voice calling application priority; therefore, if there is a TX sharing issue, the device will use its transmitting resources for frames that are associated with the voice calling application first. Once the frames for the voice calling application have been transmitted, then the device will use remaining time domain resources (if available) to transmit frames associated with the gaming application. Of course, this is a generalization, as priority between applications may be more sophisticated to ensure fairness and the eventual transmission of frames associated with the gaming application, as well as reception.

However, development of DSDA design is due in part to consumer demand for the ability to have concurrent voice call and gaming experiences. But voice call data priority may be considered less desirable in some instances if it provides noticeable gaming experience deterioration. Therefore, to better accommodate user desires, various implementations described herein may set and change priority of a multi-SIM UE to accommodate different data use types. However, the scope of implementations is not limited to voice call data and gaming application data, as the principles described herein may be adapted for use in any multi-SIM system and any combination of data types.

In one example implementation, a method of wireless communication is performed by a multi-SIM UE. The UE participates in a first communication session associated with a first SIM and participates in a second communication session associated with a second SIM. As a default, the UE applies a higher priority of access to RF resources to transmissions of the first communication session over transmissions of the second communication session. For instance, as mentioned above, the UE may enforce a hierarchy of priority for different kinds of data uses and/or applications, where voice call data is given a higher priority than gaming data. In this example, the higher priority of access is based in part on a default hierarchy of priority from the UE. Further in this example, the first communication session is associated with a voice call application, and the second communication session is associated with a gaming application.

Continuing with the example, the UE may detect a first type of packet within a data queue, where the first type of packet is associated with the first communication session. For instance, data processing resources of the UE (e.g., software or firmware running in a processor or a modem) may identify the type of data packet that is in a queue to be encoded and transmitted. An example of the type of packet may be a packet including voice data, a packet including silence data, or the like. For the specific use case in this example, it is assumed that the first type of packet includes a silence packet as defined by real-time transport protocol (RTP).

Looking to an example voice call application, it may include capabilities for one or more different coder decoders (codecs) to encode and decode voice data. Voice calls are usually expected to be bursty, with voice data occurring only during some times and silence occurring during other times. Some codecs generate silence packets when they are not actively encoding voice data, and those silence packets inform downstream devices (e.g., the other call endpoint, a network gateway, and the like) that there is a silence duration rather than voice at a given time. RTP is one such protocol that uses silence packets, though the scope of implementations is not limited to RTP, as any appropriate protocol may be used.

Continuing with the example, the UE detects a first type of packet within a data queue, and for purposes of this example the first type of packet is a silence packet. In response to detecting the silence packet, the UE may then change the higher priority from the first communication session to the second communication session. In a particular example, the UE may then change a higher priority of access so that it applies to transmissions of the second communication session (e.g., a gaming application) over transmissions of the first communication session (e.g., the voice call application).

When the higher priority is applied to transmissions of the second communication session, the data packets associated with the second communication session may be processed and transmitted as frames before data packets associated with the first communication session are processed and transmitted, at least insofar as there is a transmitting conflict. Once again, this example assumes a TX sharing issue in which the multi-SIM UE may accommodate transmission on one subscription but not the other at a given time. This may be due to the frequency domain resources granted to both subscriptions and the particular hardware/software/firmware redundancy that is either present or not present in the UE.

As mentioned above, voice calls may be bursty, and the silence duration that results in the silence packets may end as a user of the UE begins speaking, and the UE may then begin processing speaking packets on behalf of the first subscription. Accordingly, the UE may then return the higher priority of access to transmissions of the first communication session subsequent to the first type of packet (e.g., a silence packet) being transmitted. The UE may continue to monitor data packet queues for different types of data and adjust the priority as appropriate. For instance, during a given voice call, it would be expected that silence packets and speaking packets would alternate as a bursty phenomenon, and the UE may continue to give priority to data transmissions of the second communication session during silence durations and revert to giving priority to data transmissions of the second communication session during speaking durations.

Various implementations may include techniques that may be applied alternatively to or in addition to the techniques described above. For instance, when voice data is expected to produce transmission conflicts with other types of data (e.g., gaming data) the UE may additionally or alternatively reduce a bit rate of a codec associated with the voice call application. Reducing a bit rate of the codec may be expected to reduce an amount of speaking data that is transmitted as frames, thereby freeing up some amount of transmitting resources for the other types of data. In one example, the UE may cause the voice call application to transmit a control packet, such as an RTP control protocol packet change mode request (CMR) packet, to downstream components to inform them of a change in bit rate. This may be accompanied by the UE selecting a codec parameter that is associated with the lower bit rate.

In yet another implementation, the transmission priority may be changed from the voice call application to the other application based on a microphone state of the UE. For instance, when the microphone is in use, that may be taken as an indication that speaking data is being transmitted, and the default higher priority may be given to the voice call application. However, if the microphone is off, such as if the voice call goes on hold or mute, transmission priority may be given to the data of the other application (e.g., gaming application).

Various implementations may include advantages. For instance, implementations providing for changing priority of transmissions from a first application to a second application may allow for greater user satisfaction, even in those multi-SIM devices that have TX sharing. Specifically, multi-SIM devices that have TX sharing may experience transmission conflicts between applications used by the different subscriptions. The implementations described herein may allow for the data transmissions of the different applications to be accommodated fairly and in a way that is less likely to be perceived by the user as either call deterioration or gaming deterioration.

For instance, in the case of changing priority during a silence duration of a voice call, the silence packets that are given lower priority may cause little or no user perception of call deterioration, while at the same time avoiding user perception of gaming deterioration. Other techniques, such as changing priority based on a microphone state or reducing a bit rate of a voice call, may also provide adaptations to accommodate both voice calls and other types of data in ways that seek to reduce user perception of deterioration of any kind of communication session.

Furthermore, the various implementations herein allow for use of devices that have TX sharing while increasing user satisfaction. For instance, even though TX sharing may result in transmission conflicts from time to time, the implementations described herein may allow for those conflicts to be handled in ways that reduce instances in which a user would be expected to perceive deterioration of either one of the communication sessions. As a result, the various implementations may use the somewhat limited resources of a TX sharing device in ways that are more efficient than previous techniques that did not adapt for the different data used types.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing subscriptions corresponding to multiple SIMS and may set and change data use priorities as appropriate to accommodate different data use types (e.g., voice data and gaming data use types), as explained in more detail below.

Figure 2:
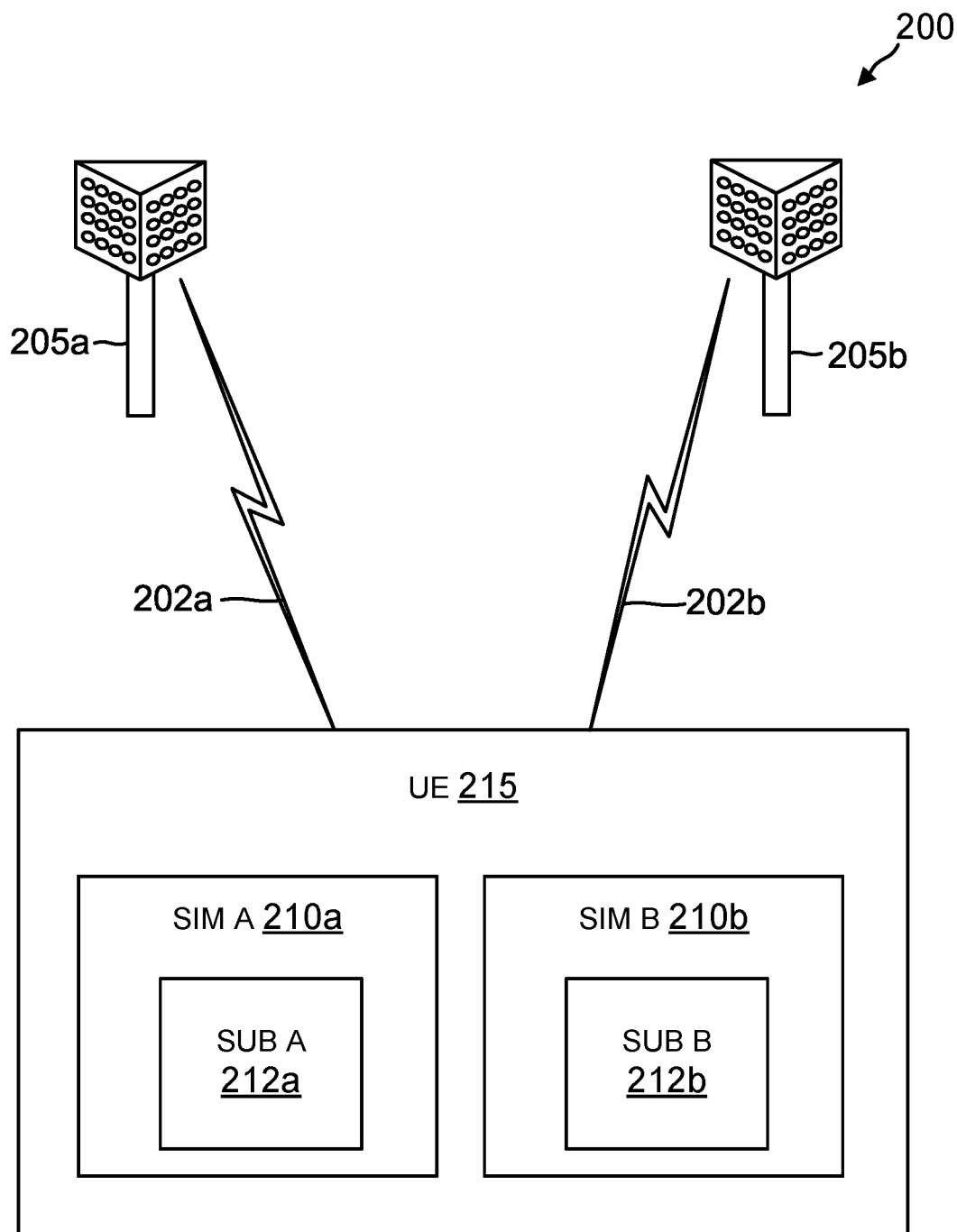
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205a and 205b) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMS (e.g., SIM cards) for communication with one or more networks. For simplicity, FIG. 2 illustrates the UE 215 including two SIMS 210 (shown as SIM A 210a and SIM B 210b), but the UE 215 may include more than two SIMS (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210a and/or SIM B 210b may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212a (shown as SUB A) with the first operator and a second subscription 212b (shown as SUB B) with the second operator. Accordingly, the SIM A 210a may store or maintain information for accessing a network of the first operator based on the first subscription 212a, and the SIM B 210b may store information for accessing a network of the second operator based on the second subscription 212b.

In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

In some aspects, the UE 215 may operate in a DSDS mode, where both SIMs 210a and 210b can be on standby (in an idle mode) waiting to begin communications. When a communication is established for one SIM (e.g., the SIM A 210a), the other SIM (e.g., the SIM B 210b) is no longer active. That is, one subscription 212a orb may be active at a given time. In another example, the UE 215 may operate in a DSDA mode, where both subscriptions 212a and b may be active at a given time.

Furthermore, UE 215 may accommodate different data use types corresponding to different subscriptions, according to the techniques described below with respect to FIGS. 4-5.

Figure 3:
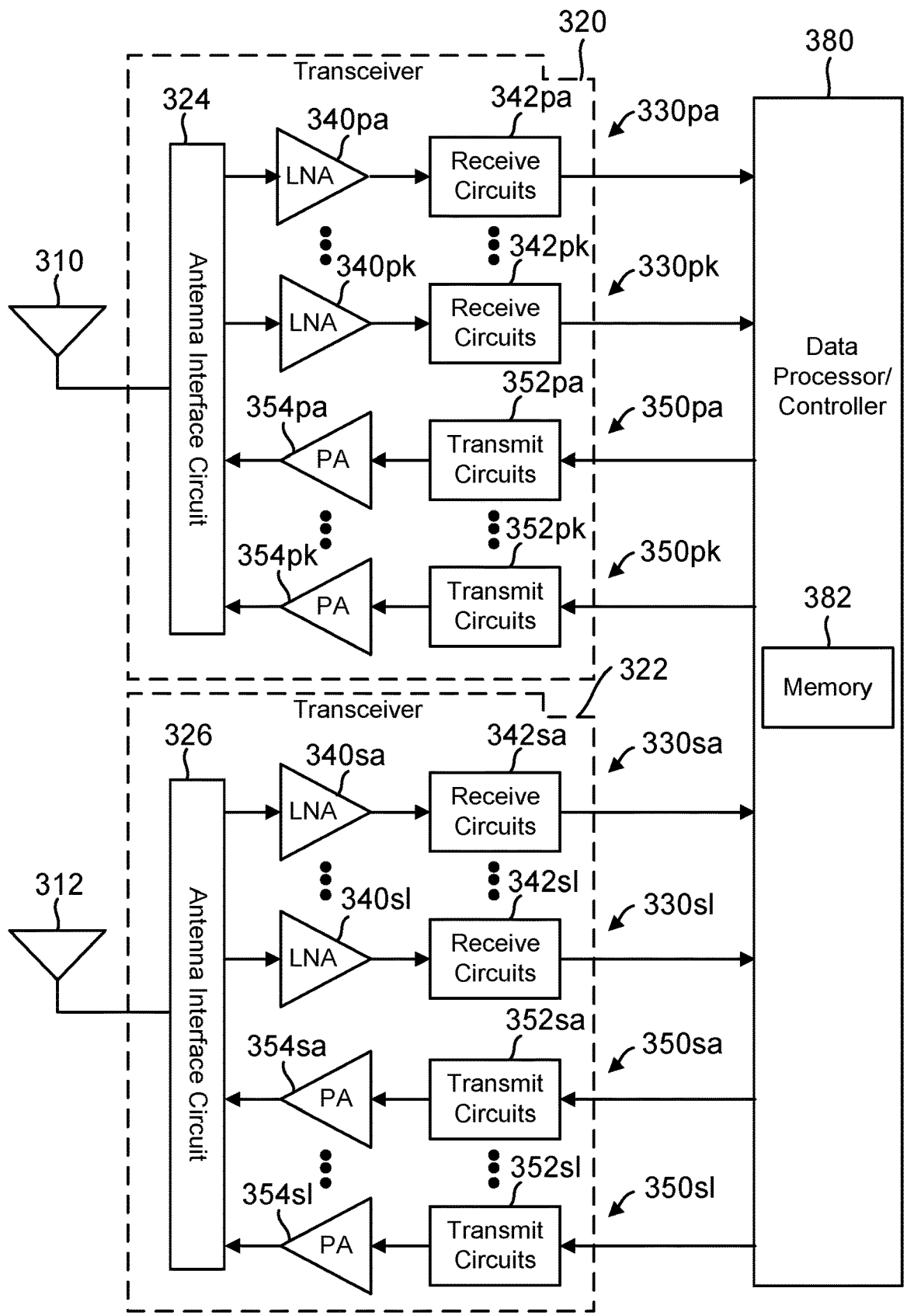
FIG. 3 is a block diagram of a hardware architecture of a UE, such as the UEs of FIGS. 1-2, according to some aspects of the present disclosure.
Figure 6:
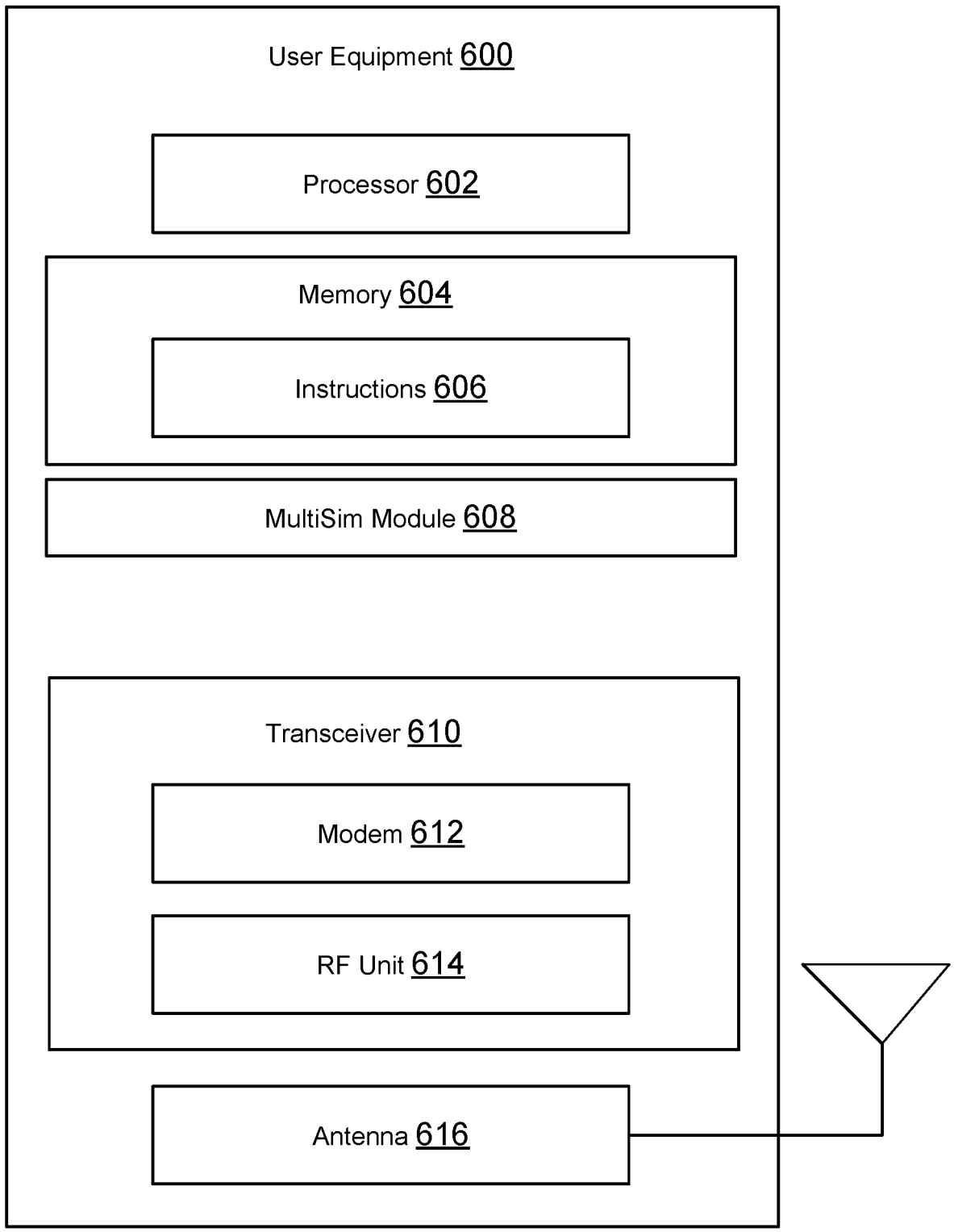
FIG. 6 illustrates a block diagram of a user equipment (UE) according to some aspects of the present disclosure.

FIG. 3 illustrates an example hardware architecture for RF chains, which may be implemented within UE 115 (FIG. 1), UE 215 (FIG. 2), or UE 600 (FIG. 6). In this exemplary design, the hardware architecture includes a transceiver 320 coupled to a first antenna 310, a transceiver 322 coupled to a second antenna 312, and a data processor/controller 380. Transceiver 320 includes multiple (K) receivers 330pa to 330pk and multiple (K) transmitters 350pa to 350pk to support multiple frequency bands, multiple radio technologies, carrier aggregation, etc. Transceiver 322 includes L receivers 330sa to 330s1 and L transmitters 350sa to 350s1 to support multiple frequency bands, multiple radio technologies, carrier aggregation, receive diversity, MIMO transmission from multiple transmit antennas to multiple receive antennas, etc.

In the exemplary design shown in FIG. 3, each receiver 330 includes an LNA 340 and receive circuits 342. For data reception, antenna 310 receives signals from base stations and/or other transmitter stations and provides a received RF signal, which may be routed through an antenna interface circuit 324 and presented as an input RF signal to a selected receiver. Antenna interface circuit 324 may include switches, duplexers, transmit filters, receive filters, matching circuits, etc. The description below assumes that receiver 330pa is the selected receiver, though the described operations apply equally well to any of the other receivers 330. Within receiver 330pa, an LNA 340pa amplifies the input RF signal and provides an output RF signal. Receive circuits 342pa downconvert the output RF signal from RF to baseband, amplify and filter the downconverted signal, and provide an analog input signal to data processor 380. Receive circuits 342pa may include mixers, filters, amplifiers, matching circuits, an oscillator, a local oscillator (LO) generator, a phase locked loop (PLL), etc. Each remaining receiver 330 in transceivers 320 and 322 may operate in a similar manner as receiver 330pa.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350pa is the selected transmitter, though the described operations apply equally well to any of the other transmitters 350. Within transmitter 350pa, transmit circuits 352pa amplify, filter, and upconvert the analog output signal from baseband to RF and provide a modulated RF signal. Transmit circuits 352pa may include amplifiers, filters, mixers, matching circuits, an oscillator, an LO generator, a PLL, etc. A PA 354pa receives and amplifies the modulated RF signal and provides a transmit RF signal having the proper output power level. The transmit RF signal may be routed through antenna interface circuit 324 and transmitted via antenna 310. Each remaining transmitter 350 in transceivers 320 and 322 may operate in a similar manner as transmitter 350pa.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog (ICs), RF ICs (RFICs), mixed-signal ICs, etc. For example, LNAs 340 and receive circuits 342 within transceivers 320 and 322 may be implemented on multiple IC chips or on the same IC chip. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

Controller 380 may be in communication with transceivers 320, 322 to provide DSDA operation in which one subscription may be transmitting and receiving data, while the other subscription may also transmit and receive data in a manner that appears concurrent to a human user. The controller 380 may execute software logic that assigns one of the transceivers 320, 322 to a particular subscription and the other one of the transceivers to the other subscription in a dual-SIM implementation. In another example, the controller 380 may assign both transceivers 320, 322 to both subscriptions, thereby allowing both subscriptions to employ multi-antenna operations, such as MIMO operation and beam forming.

In one example implementation, a UE that includes the architecture of FIG. 3 may be able to provide transmission resources during DSDA mode for some band combinations but not for others at a given time. For instance, oscillator resources, PA resources, software and firmware resources, filter resources, and or the like may not be able to provide transmission on some band combinations using a same time domain resource. One example includes some UEs that are unable to allow both subscriptions to transmit on N1 band at the same time, though the scope of implementations may be applied to any band combination that may experience a transmission conflict for a particular UE.

However, a UE may be implemented to include software and/or firmware that is executed by processing resources (e.g., data processor 380, processing resources at a modem (not shown), or the like) to accommodate different data use types despite TX sharing limitations. Functionality provided by the software and/or firmware is described in more detail above and with respect to FIGS. 4-5.

Figure 4:
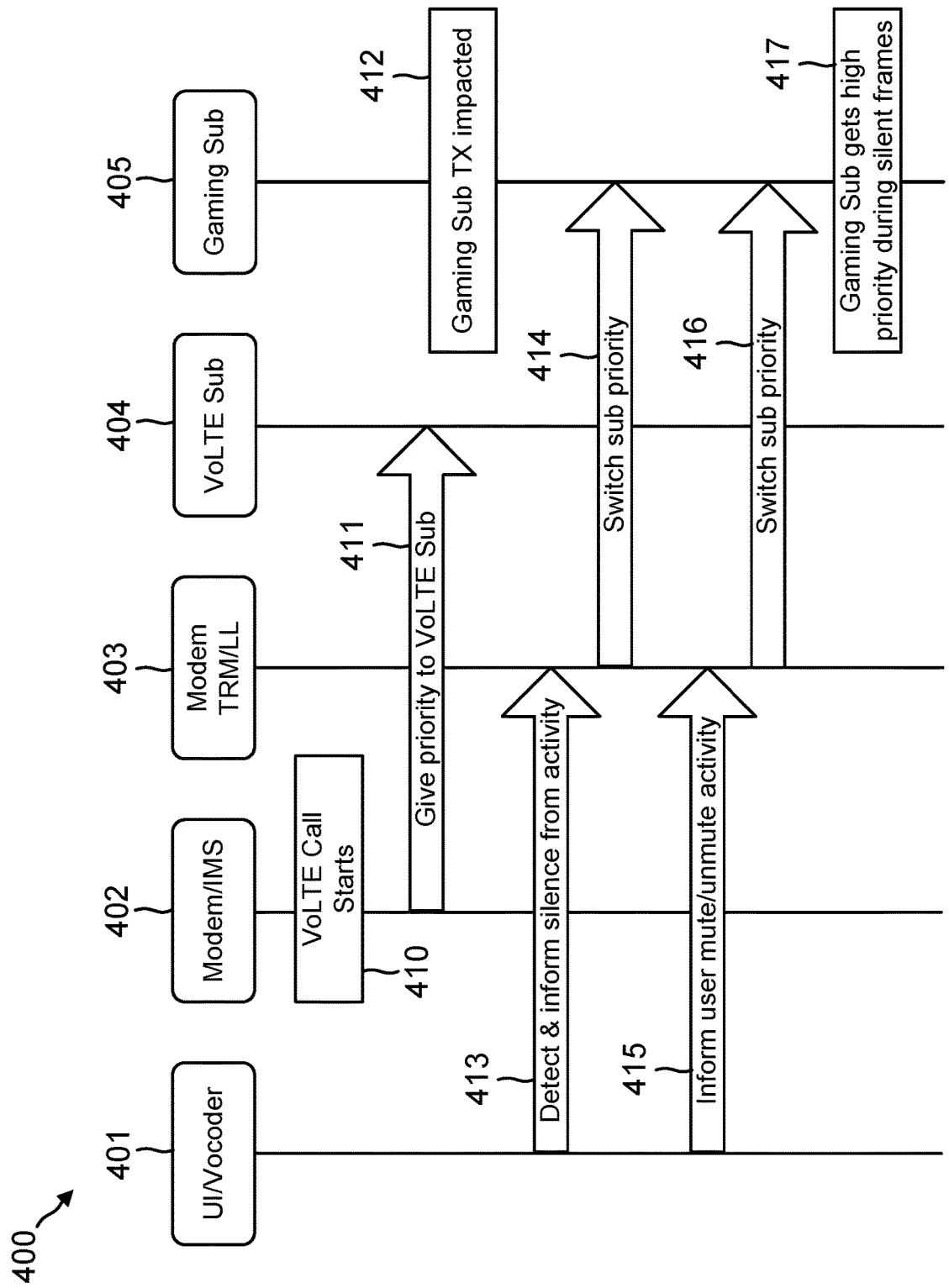
FIG. 4 is signal diagram for example priority-changing techniques in a multi-SIM device, according to some aspects of the disclosure.

FIG. 4 is signal diagram of 400 of example techniques to accommodate different data type uses in a multi-Sim device, according to one implementation. The signal diagram 400 may represent the operation of a UE, such as UE 115 (FIG. 1), UE 215 (FIG. 2), or UE 600 (FIG. 6).

Signal diagram 400 includes user interface (UI) and voice encoder or vocoder (a type of voice codec) collectively shown as item 401. The modem is broken into two items, 402, 403. Modem/IMS 402 represents the IMS (IP multimedia core network subsystem) portion of the modem that handles communications with the network. Modem TRM/LL 403 represents the transmission/reception management module and lower layer protocol stack (TRM/LL) portion of the modem that may inspect packets and perform other actions in response to packet contents. Of course, division of the modem into separate items 402, 403 is for illustration only, and it is understood the separation of items 402, 403 may or may not represent a hardware separation. In other words, items 402, 403 may be included in a same modem device, and it would be just as correct to represent items 402, 403 is a single item in a different signal diagram.

Signal diagram 400 also includes a first subscription 404. The first subscription 404 is indicated as providing voice over LTE (VoLTE) functionality, though the scope of implementations is not limited to any particular radio technology for voice functionality. For instance, in another implementation, the first subscription may provide voice functionality using NR. Signal diagram 400 also includes a second subscription 405, which in this example is used for gaming, though the scope of implementations may include any data use type.

Consistent with the examples given above, each of the subscriptions 404, 405 is associated with a different SIM and may communicate with a same or different base station and may correspond to a same service provider or a different service provider. The UE, which includes items 401-405 may operate in a DSDA mode when appropriate so that both subscriptions 404, 405 may be active concurrently.

The signal diagram 400 begins by assuming that the second subscription 405 is communicating data consistent with use of a gaming application that is running on the UE. The voice call application has not yet begun to operate before action 410. At action 410, the voice call application commences operation, which is the start of the DSDA mode in which both subscriptions 404, 405 are concurrently active. Continuing with the example, the UE gives transmission priority to the first subscription 404 at action 411. However, this causes the second subscription 405 to be impacted by TX sharing at action 412.

At action 413, the UI/vocoder 401 detects silence. For instance, the vocoder may recognize a pause in human speech and may generate silence packets in response to the pause. The modem TRM/LL 403 may recognize the silence packets and then switch transmission priority from the first subscription 404 to the second subscription 405 in response to the silence. It is expected that speaking packets will eventually be generated by the UI/vocoder 401, so the modem TRM/LL 403 may continue to monitor a data queue that handles the packets so that it can return priority to the first subscription 404 when the silence duration is over and speaking resumes.

Alternatively, or in addition, the UI/vocoder 401 may detect a state of the microphone of the UE at action 415, and then the modem TRM/LL 403 may change priority from the first subscription 404 to the second subscription 405 in response to the microphone state at action 416. For example, the modem TRM/LL 403 may detect that the microphone is off or muted or that the voice call is on hold and then change the priority to the second subscription 405 in response to detecting the state. Once again, it may be expected that the state of the microphone may change again to an ON or un-muted state, so the modem TRM/LL 403 may continue to monitor the state of the microphone to switch priority back to the first subscription 404 is appropriate.

Action 417 indicates that the second subscription 405 receives the higher transmission priority in response to actions 414, 416. As noted above, as conditions change, the higher transmission priority may be switched back to the first subscription 404 based on speaking being resumed, the microphone turning back on, or the like.

Although not shown in FIG. 4, some implementations may reduce a bit rate of the voice call in order to accommodate data transmissions from the gaming application. Such operation may be performed additionally to, or as an alternative to, the actions shown in FIG. 4.

Figure 5:
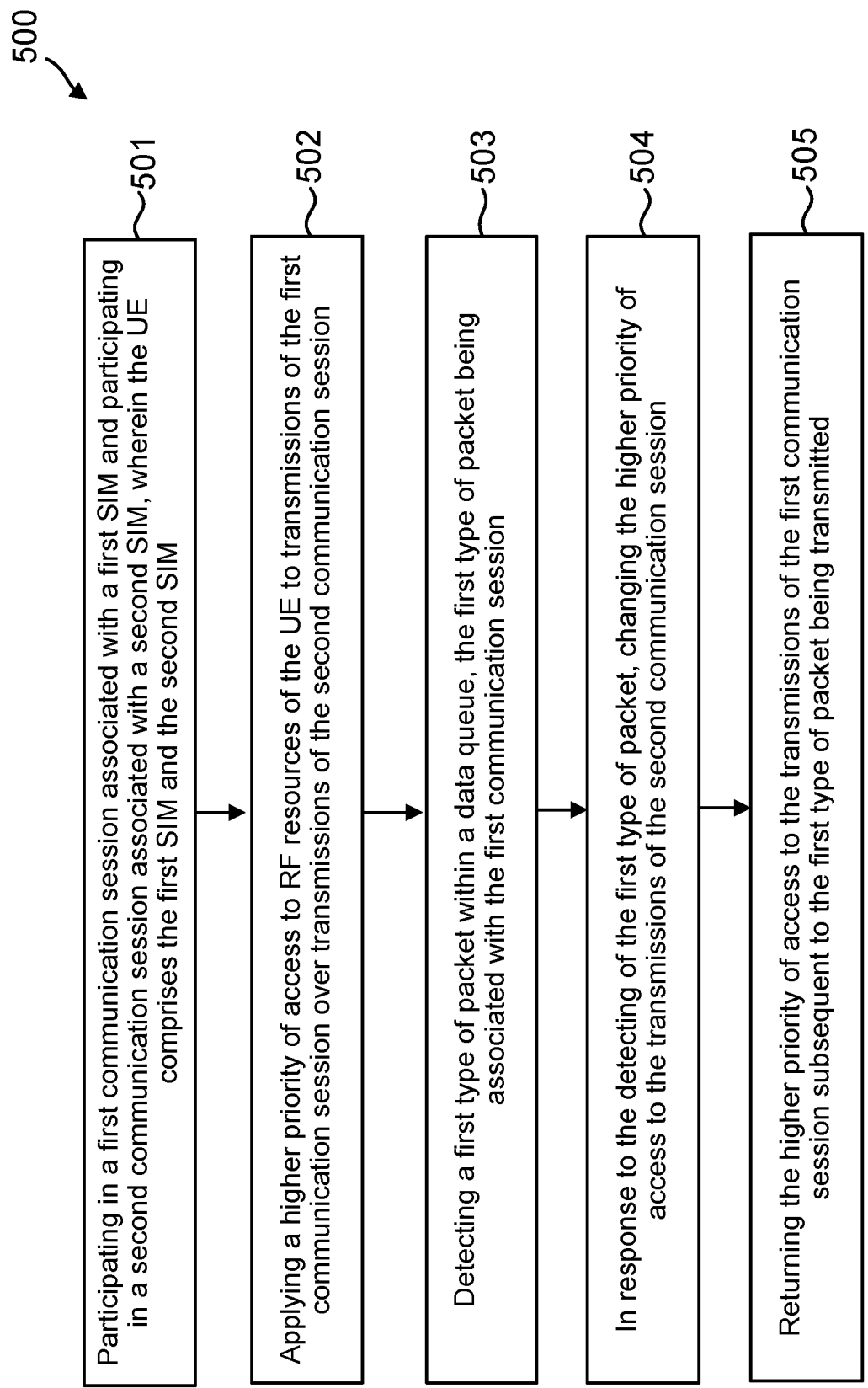
FIG. 5 is a diagram of an example method for accommodating concurrent use of different types of data (e.g., voice and gaming), according to some aspects of the present disclosure.

FIG. 5 is a flowchart of a method 500 to accommodate different data types in a multi-SIM system, according to some aspects of the present disclosure. The method 500 may be performed by a UE, such as UE 115 (FIG. 1), UE 215 (FIG. 2), or UE 600 (FIG. 6). As illustrated, the method 500 includes a number of enumerated actions, but aspects of the method 500 may include additional actions before, after, and in between the enumerated actions. In some aspects, one or more of the enumerated actions may be omitted or performed in a different order.

Method 500 may be performed in the context of a multi-SIM UE that has TX sharing. In other words, the UE may support DSDA operation, but some band combinations may result in the first subscription and the second subscription sharing particular RF resources that cannot be used by both subscriptions at the same time. Method 500 provides techniques for accommodating a first data use type (e.g., voice data use) and a second data use type (e.g., gaming data use) despite the TX sharing issue.

At action 501, the UE participates in a first communication session associated with a first SIM. For instance, the first communication session may include a voice communication session that is associated with a first subscription. The UE also participates in a second communication session associated with a second SIM. For instance, the second communication session may include web browsing, gaming, or other use and may be associated with a second subscription.

At action 502, the UE applies a higher priority of access to RF resources to transmissions of the first communication session over transmissions of the second communication session. This may be a function of a default priority functionality of the UE, where the UE is programmed to have a priority hierarchy for different data use types. For instance, voice and video calls may have a top priority, gaming may have a second priority, web browsing and other functionality may have a third priority, and on and on. At action 502, the UE applies its default priority functionality to give a higher priority of access to RF resources to the first communication session because in this example the first communication session includes a voice call.

At action 503, the UE detects a first type of packet within a data queue. For instance, the UE may detect a silence packet within a queue of data, wherein that data is set to be sent to an RF front end and transmitted as frames. The UE may monitor the data queue and recognize the silence packets, as they may be defined by a particular protocol, such as RTP. The UE may identify the first type of data packet using any appropriate protocol stack layer, including an application layer. For instance, a higher layer functionality, such as a user interface application, may detect a silence packet and then inform lower protocol stack layers at the modem. In another example, the lower protocol stack layers may themselves detect the silence packet. In any event, functionality within the UE detects a particular kind of data to be transmitted.

At action 504, the UE changes the higher priority of access to apply to the transmissions of the second communication system. For instance, upon detecting a silence packet, the UE may then give data from the second subscription (e.g., associated with a gaming communication session) higher priority of access to transmission resources. Thus, when there is a transmission conflict between data from the first communication session and data from the second communication session, the UE may then select the data from the second communication session to be transmitted first and hold the data from the first communication session to be transmitted after.

This represents a divergence from the default priority settings of the UE that were discussed above. As noted above, the default priority settings would apply the higher priority to transmissions of the first communication session so that in the event of a transmission conflict, the transmissions of the first communication session would go first. However, various implementations described herein include functionality to change priority settings during appropriate times.

At action 505, the UE returns a higher priority of access to the transmissions of the first communication session. For instance, subsequent to the first type of packet being transmitted and subsequent to a silence duration ending, the UE may detect a second type of packet. An example of a second type of packet may be a speaking packet that carries actual voice data rather than an indication of silence. Upon detection of the second type of packet, the UE may then return the higher priority of access to the transmissions of the first communication session, which leaves the transmissions of the second communication session at a lower priority level and consistent with the default priority setting.

Although not shown in FIG. 5, method 500 may include additional or alternative functionalities. For instance, functionality to reduce a bit rate of the first communication session in response to detecting the second communication session may be performed either additionally to method 500 or alternatively to method 500. Furthermore, the setting and adjusting of priority between the first communication session and the second communication session may be performed in response to a microphone status of the UE. For example, the microphone being muted or the call being on hold may trigger the UE to change the higher priority of access, similar to action 504, and the microphone being un-muted or the call being resumed may cause a higher priority of access to return to the first communication session, similar to action 505. Such functionality may be performed either additionally to method 500 or alternatively to method 500.

The actions 501-505 may be repeated as often as appropriate. For instance, as the UE moves from one base station to another base station, configurations may be changed, including UL frequency resource grants. While some band combinations may cause TX sharing, other band combinations may not cause TX sharing, and as configurations change those band combinations may change. Accordingly, method 500 may be performed in response to band combinations that cause TX sharing, whereas the UE may not perform method 500 when a band combination of the first communication session and the second communication session does not result in TX sharing. However, as band combinations are used which may result in TX sharing, the UE may perform actions 501-505 when appropriate. Further, as a first communication session may alternate between first data (e.g., speaking data) and second data (e.g., silence data), the UE may perform actions 503-504 as often as appropriate to accommodate both communication sessions.

FIG. 6 is a block diagram of an exemplary UE 600 according to some aspects of the present disclosure. The UE 600 may be a UE 115 or UE 215 as discussed above in FIGS. 1-2 and may conform to the hardware architecture described above with respect to FIG. 3. As shown, the UE 600 may include a processor 602, a memory 604, a multi-SIM module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to a UE 115, 215 in connection with aspects of the present disclosure, for example, aspects of FIGS. 1-5. Instructions 606 may also be referred to as code, which may include any type of computer-readable statements.

The Multi-SIM module 608 may be implemented via hardware, software, or combinations thereof. For example, the multi-SIM module 608 may be implemented as a processor, circuit, and/or instructions 606 stored in the memory 604 and executed by the processor 602.

In some aspects, the Multi-SIM module 608 may include multiple SIMS or SIM cards (e.g., 2, 3, 4, or more) similar to the SIMS 210. Each SIM may be configured to store information used for accessing a network, for example, to authenticate and identify the UE 600 as a subscriber of the network. Some examples of information stored on a SIM may include, but not limited to, a subscriber identity such as an international mobile subscriber identity (IMSI) and/or information and/or key used to identify and authenticate the UE 600 in a certain provider network. In some aspects, the UE 600 may have a first service provider subscription on a first SIM of the multiple SIMS and a second service provider subscription on a second SIM of the multiple SIMS. The first subscription may identify the UE 600 by a first subscriber identity, and the second subscription may identify the UE 600 by a second subscriber identity.

In some embodiments, the functionality described above with respect to FIGS. 4-5 may be included as logic within multi-SIM module 608. Other embodiments, the functionality may be included in another component, such as in computer readable code within instructions 606 in memory 604.

As shown, the transceiver 610 may include the modem subsystem 612 and the RF unit 614. The transceiver 610 can be configured to communicate bi-directionally with other devices, such as the BSs 105 and 700. The modem subsystem 612 may be configured to modulate and/or encode the data from the memory 604 and the multi-SIM module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 614 may be further configured to perform analog beamforming in conjunction with digital beamforming. Although shown as integrated together in transceiver 610, the modem subsystem 612 and the RF unit 614 may be separate devices that are coupled together at the UE 600 to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., RRC configurations, MIB, PDSCH data and/or PDCCH DCIs, etc.) to the multi-SIM module 608 for processing. The antennas 616 may include multiple antennas of similar or different designs in order to sustain multiple transmission links.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
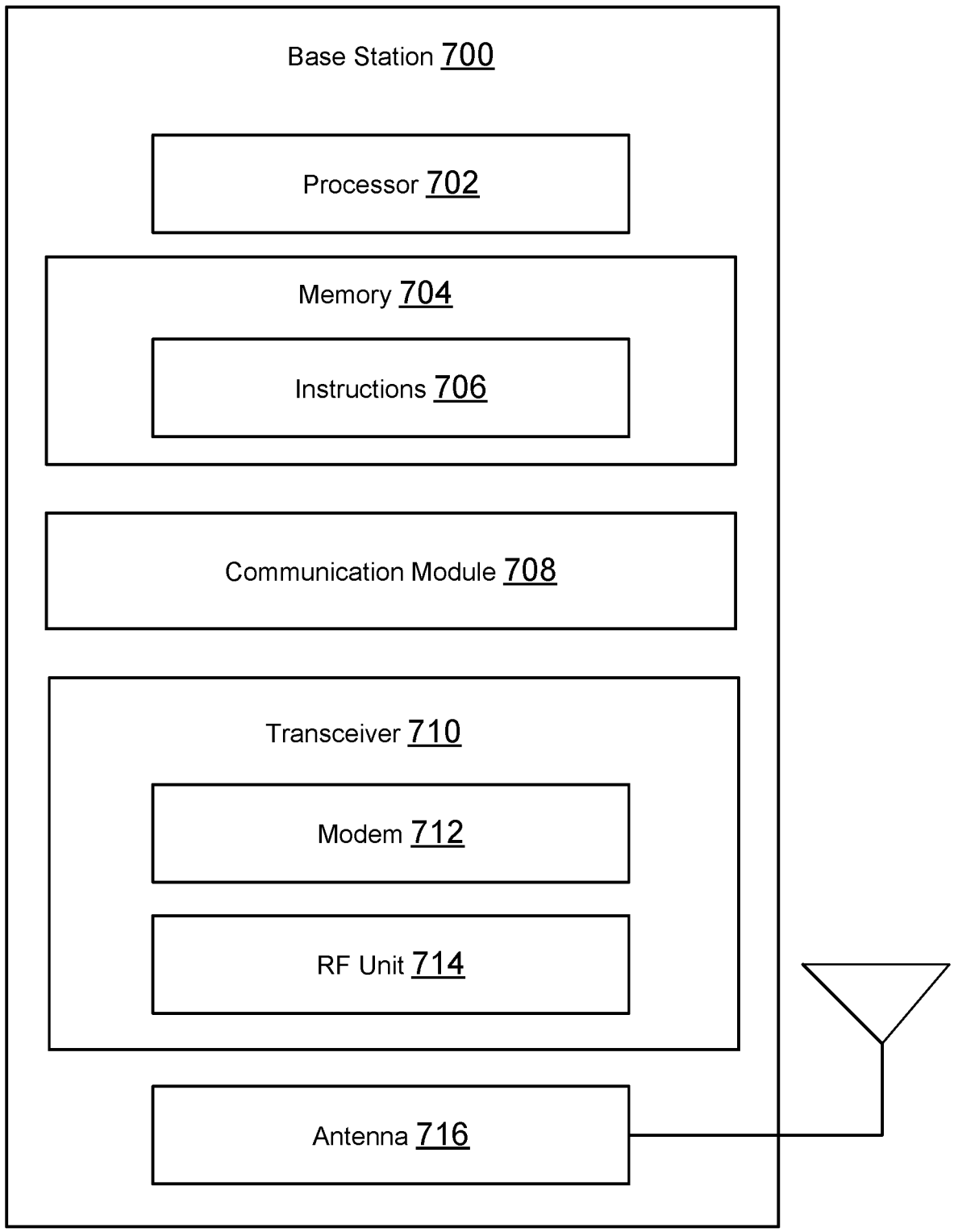
FIG. 7 illustrates a block diagram of a base station (BS) according to some aspects of the present disclosure.

FIG. 7 is a block diagram of an exemplary BS 700 according to some aspects of the present disclosure. The BS 700 may be a BS 105 or a BS 205 as discussed in FIGS. 1 and 2. As shown, the BS 700 may include a processor 702, a memory 704, a communication module 708, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1 and 2. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 708 may be implemented via hardware, software, or combinations thereof. For example, the communication module 708 may be implemented as a processor, circuit, and/or instructions 706 stored in the memory 704 and executed by the processor 702. In some examples, the communication module 708 can be integrated within the modem subsystem 712. For example, the communication module 708 can be implemented by a combination of software components (e.g., executed by a DSP or a general processor) and hardware components (e.g., logic gates and circuitry) within the modem subsystem 712. The communication module 708 may communicate with one or more components of BS 700 to implement various aspects of the present disclosure, for example, aspects of FIGS. 1 and 2.

As shown, the transceiver 710 may include the modem subsystem 712 and the RF unit 714. The transceiver 710 can be configured to communicate bi-directionally with other devices, such as the UEs 115, 215 and/or UE 600 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 712 (on outbound transmissions) or of transmissions originating from another source such as a UE 115, 215, and/or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., PUSCH data, PUCCH UCI, MSG1, MSG3, etc.) to the communication module 708 for processing. The antennas 716 may include multiple antennas of similar or different designs in order to sustain multiple transmission links.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Further aspects of the present disclosure include the following clauses:

1. A method of wireless communication performed by a user equipment (UE), the method comprising:
   participating in a first communication session associated with a first subscriber identity module (SIM) and participating in a second communication session associated with a second SIM, wherein the UE comprises the first SIM and the second SIM;
   applying a higher priority of access to radio frequency (RF) resources of the UE to transmissions of the first communication session over transmissions of the second communication session;
   detecting a first type of packet within a data queue, the first type of packet being associated with the first communication session;
   in response to the detecting of the first type of packet, changing the higher priority of access to the transmissions of the second communication session; and
   returning the higher priority of access to the transmissions of the first communication session subsequent to the first type of packet being transmitted.

2. The method of clause 1, wherein the first communication session comprises a voice or video call and wherein the second communication session comprises gaming.

3. The method of any of clauses 1-2, wherein the first SIM and the second SIM are both in an active mode at a same time during both the first communication session and the second communication session.

4. The method of any of clauses 1-3, wherein the first type of packet comprises a silence packet in a voice communication session, and wherein a second type of packet comprises a speaking packet in the voice communication session.

5. The method of any of clauses 1-4, wherein the higher priority of access is returned to the transmissions of the first communication session in response to detecting speaking packets of the first communication session in the data queue subsequent to a silence packet of the first communication session being transmitted by the first SIM.

6. The method of any of clauses 1-5, wherein detecting the first type of packet within the data queue comprises receiving a communication from a protocol layer associated with voice encoding, the communication indicating presence of the first type of packet.

7 The method of any of clauses 1-6, further comprising:
   reducing a bit rate of an encoder associated with the first communication session in response to participation in the second communication session.

8. The method of any of clauses 7, wherein reducing the bit rate further comprises sending a control protocol packet to one or both of an endpoint or a network entity, the control protocol packet indicating a reduced bit rate.

9. The method of any of clauses 1-8, further comprising:
   changing the higher priority of access to the transmissions of the second communication session in response to a microphone of the UE being turned off; and
   returning the higher priority of access to the transmissions of the first communication session in response to the microphone of the UE being turned on.

10. A user equipment (UE) comprising:
    a first subscriber identity module (SIM) associated with a first service provider subscription and a second SIM associated with a second service provider subscription; and
    a processor configured to access the first SIM and the second SIM, wherein the processor is further configured to:
       operate in a mode in which the first service provider subscription and the second service provider subscription are concurrently active, further wherein the mode includes a first application associated with the first service provider subscription having priority over a second application associated with the second service provider subscription.
       identify silence associated with the first application;
       change the priority to the second application over the first application in response to identifying a silence;
       return priority to the first application subsequent to a duration of the silence.

11. The UE of clause 10, wherein changing the priority to the second application comprises:
    prioritizing second frames, associated with the second application, for transmission; and
    transmitting first frames, associated with the first application, subsequent to the second frames being transmitted.

12. The UE of any of clauses 10-11, wherein the mode includes a Dual SIM Dual Active (DSDA) mode.

13. The UE of any of clauses 10-12, wherein the processor is further configured to:
    identify a transmitting conflict between the first service provider subscription and the second service provider subscription, wherein changing the priority to the second application is performed based at least in part in response to identifying the transmitting conflict.

14. The UE of clause 13, wherein the transmitting conflict includes radio frequency (RF) resources of the UE being unavailable to transmit first frames, associated with the first application, and second frames, associated with the second application, using a same time domain resource.

15. The UE of any of clauses 10-14, wherein the first application comprises a voice call application, and wherein the second application comprises a gaming application.

16. The UE of any of clauses 10-15, wherein the mode includes the first application having the priority as a default, and wherein changing the priority to the second application includes overriding the default.

17. The UE of any of clauses 10-16, wherein identifying the silence comprises:
    identifying a packet, associated with the first application, wherein the packet represents the silence according to a coder decoder (codec) associated with the first service provider subscription.

18. The UE of any of clauses 10-17, wherein the processor is further configured to:
    reduce a bit rate of a coder decoder (codec) associated with the first service provider subscription in response to operation of the second application.

19. The UE of any of clauses 10-18, wherein the processor is further configured to:
    change the priority to the second application over the first application in response to a microphone state of the UE.

20. A non-transitory computer-readable medium having program code recorded thereon for wireless communication by a user equipment (UE), the program code comprising:

code for operating in a mode in which a first service provider subscription associated with a first subscriber identity module (SIM) and a second service provider subscription associated with a second SIM share radio frequency (RF) transmission resources of the UE;

code for applying a higher priority to first data packets, associated with the first service provider subscription, than to second data packets, associated with the second service provider subscription, as a default for transmission during the mode;

code for applying the higher priority to the second data packets, over the first data packets, in response to identifying a silence duration associated with the first service provider subscription; and code for returning the higher priority to the first data packets subsequent to the silence duration.

21. The non-transitory computer-readable medium of clause 20, further comprising:

code for reducing a bit rate of a coder decoder (codec) associated with the first service provider subscription in response to operation of an application associated with the second service provider subscription.

22. The non-transitory computer-readable medium of any of clauses 20-21, further comprising:

code for changing the higher priority to the second data packets in response to a microphone state of the UE.

23. The non-transitory computer-readable medium of any of clauses 20-22, further comprising:

code for identifying a conflict between the first data packets and the second data packets, wherein the conflict prevents the first data packets and the second data packets from using a same time domain resource; and code for applying the higher priority to the second data packets based at least in part on identifying the conflict.

24. The non-transitory computer-readable medium of any of clauses 20-23, further comprising:

code for providing voice functionality for the first service provider subscription and for providing gaming functionality for the second service provider subscription; and code for applying the higher priority as the default for transmission during the mode in response to identifying concurrent use of the voice functionality in the gaming functionality.

25. A user equipment (UE) comprising:

a first subscriber identity module (SIM) associated with a first service provider subscription and a second SIM associated with a second service provider subscription;

means for concurrently running a voice application and a gaming application, wherein the voice application is associated with the first service provider subscription and the gaming application is associated with the second service provider subscription; and means for setting a transmission priority for the voice application relative to the gaming application based at least in part on detecting a silence duration associated with the voice application.

26. The UE of clause 25, further comprising:

means for setting the transmission priority for the voice application relative to the gaming application based at least in part on a microphone state of the UE.

27. The UE of any of clauses 25-26, further comprising:

adjusting a bit rate of a coder decoder (codec), associated with the voice application, in response to detecting operation of the gaming application. The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

participating in a first communication session associated with a first subscriber identity module (SIM) and participating in a second communication session associated with a second SIM, wherein the UE comprises the first SIM and the second SIM;

applying a higher priority of access to radio frequency (RF) resources of the UE to transmissions of the first communication session over transmissions of the second communication session;

detecting a first type of packet within a data queue, the first type of packet being associated with the first communication session;

in response to the detecting of the first type of packet, changing the higher priority of access to the transmissions of the second communication session;

transmitting data from the second communication session based on the higher priority of access and in response to detecting a transmission conflict between data from the first communication session and data from the second communication session; and returning the higher priority of access to the transmissions of the first communication session subsequent to the first type of packet being transmitted.

2. The method of claim 1, wherein the first communication session comprises a voice or video call and wherein the second communication session comprises gaming.

3. The method of claim 1, wherein the first SIM and the second SIM are both in an active mode at a same time during both the first communication session and the second communication session.

4. The method of claim 1, wherein the first type of packet comprises a silence packet in a voice communication session, and wherein a second type of packet comprises a speaking packet in the voice communication session.

5. The method of claim 1, wherein the higher priority of access is returned to the transmissions of the first communication session in response to detecting speaking packets of the first communication session in the data queue subsequent to a silence packet of the first communication session being transmitted by the first SIM.

6. The method of claim 1, wherein detecting the first type of packet within the data queue comprises receiving a communication from a protocol layer associated with voice encoding, the communication indicating presence of the first type of packet.

7. The method of claim 1, further comprising:
reducing a bit rate of an encoder associated with the first communication session in response to participation in the second communication session.

8. The method of claim 7, wherein reducing the bit rate further comprises sending a control protocol packet to one or both of an endpoint or a network entity, the control protocol packet indicating a reduced bit rate.

9. The method of claim 1, further comprising:
changing the higher priority of access to the transmissions of the second communication session in response to a microphone of the UE being turned off; and
returning the higher priority of access to the transmissions of the first communication session in response to the microphone of the UE being turned on.

10. A user equipment (UE) comprising:
a first subscriber identity module (SIM) associated with a first service provider subscription and a second SIM associated with a second service provider subscription; and
a processor configured to access the first SIM and the second SIM, wherein the processor is further configured to:
operate in a mode in which the first service provider subscription and the second service provider subscription are concurrently active, further wherein the mode includes a first application associated with the first service provider subscription having priority over a second application associated with the second service provider subscription;
change the priority to the second application over the first application in response to identifying a silence associated with the first application;
transmit data from the second application based on the priority and in response to detecting a transmission conflict between data from the first application and data from the second application; and
return priority to the first application subsequent to a duration of the silence.

11. The UE of claim 10, wherein changing the priority to the second application comprises:
prioritizing second frames, associated with the second application, for transmission; and
transmitting first frames, associated with the first application, subsequent to the second frames being transmitted.

12. The UE of claim 10, wherein the mode includes a Dual SIM Dual Active (DSDA) mode.

13. The UE of claim 10, wherein the processor is further configured to:
identify a transmitting conflict between the first service provider subscription and the second service provider subscription, wherein changing the priority to the second application is performed based at least in part in response to identifying the transmitting conflict.

14. The UE of claim 13, wherein the transmitting conflict includes radio frequency (RF) resources of the UE being unavailable to transmit first frames, associated with the first application, and second frames, associated with the second application, using a same time domain resource.

15. The UE of claim 10, wherein the first application comprises a voice call application, and wherein the second application comprises a gaming application.

16. The UE of claim 10, wherein the mode includes the first application having the priority as a default, and wherein changing the priority to the second application includes overriding the default.

17. The UE of claim 10, wherein identifying the silence comprises:
identifying a packet, associated with the first application, wherein the packet represents the silence according to a coder decoder (codec) associated with the first service provider subscription.

18. The UE of claim 10, wherein the processor is further configured to:
reduce a bit rate of a coder decoder (codec) associated with the first service provider subscription in response to operation of the second application.

19. The UE of claim 10, wherein the processor is further configured to:
change the priority to the second application over the first application in response to a microphone state of the UE.

20. A non-transitory computer-readable medium having program code recorded thereon for wireless communication by a user equipment (UE), the program code comprising:
code for operating in a mode in which a first service provider subscription associated with a first subscriber identity module (SIM) and a second service provider subscription associated with a second SIM share radio frequency (RF) transmission resources of the UE;
code for applying a higher priority to first data packets, associated with the first service provider subscription, than to second data packets, associated with the second service provider subscription, as a default for transmission during the mode;
code for applying the higher priority to the second data packets, over the first data packets, in response to identifying a silence duration associated with the first service provider subscription;
code for transmitting data from the second data packets based on the higher priority and in response to detecting a transmission conflict between data from the first data packets and data from the second data packets; and
code for returning the higher priority to the first data packets subsequent to the silence duration.

21. The non-transitory computer-readable medium of claim 20, further comprising:
　code for reducing a bit rate of a coder decoder (codec) associated with the first service provider subscription in response to operation of an application associated with the second service provider subscription.

22. The non-transitory computer-readable medium of claim 20, further comprising:
　code for changing the higher priority to the second data packets in response to a microphone state of the UE.

23. The non-transitory computer-readable medium of claim 20, further comprising:
　code for identifying a conflict between the first data packets and the second data packets, wherein the conflict prevents the first data packets and the second data packets from using a same time domain resource; and
　code for applying the higher priority to the second data packets based at least in part on identifying the conflict.

24. The non-transitory computer-readable medium of claim 20, further comprising:
　code for providing voice functionality for the first service provider subscription and for providing gaming functionality for the second service provider subscription; and
　code for applying the higher priority as the default for transmission during the mode in response to identifying concurrent use of the voice functionality in the gaming functionality.

25. A user equipment (UE) comprising:
　a first subscriber identity module (SIM) associated with a first service provider subscription and a second SIM associated with a second service provider subscription;
　means for concurrently running a voice application and a gaming application, wherein the voice application is associated with the first service provider subscription and the gaming application is associated with the second service provider subscription;
　means for setting a transmission priority for the voice application relative to the gaming application based at least in part on detecting a silence duration associated with the voice application; and
　means for transmitting data from the gaming application based on the transmission priority and in response to detecting a transmission conflict between data from the gaming application and data from the voice application.

26. The UE of claim 25, further comprising:
　means for setting the transmission priority for the voice application relative to the gaming application based at least in part on a microphone state of the UE.

27. The UE of claim 25, further comprising:
　adjusting a bit rate of a coder decoder (codec), associated with the voice application, in response to detecting operation of the gaming application.

\* \* \* \* \*